(12) United States Patent
Chang et al.

(10) Patent No.: US 7,401,294 B2
(45) Date of Patent: Jul. 15, 2008

(54) METHOD AND SYSTEM FOR COLLABORATIVE WEB BROWSING

(75) Inventors: Hung-Yang Chang, Westchester County, NY (US); Fenno F. Heath, III, New Haven County, CT (US); Hui Lei, Westchester County, NY (US); Jenny S. Li, Fairfield County, CT (US); Yashodhara Patnaik, Westchester County, NY (US); Michael Dikun, Nassau County, NY (US)

(73) Assignee: International Business Machines Corporation, Armonk, NY (US)

( * ) Notice: Subject to any disclaimer, the term of this patent is extended or adjusted under 35 U.S.C. 154(b) by 712 days.

(21) Appl. No.: 10/718,541

(22) Filed: Nov. 24, 2003

(65) Prior Publication Data
US 2005/0114789 A1 May 26, 2005

(51) Int. Cl.
*G06F 3/00* (2006.01)
(52) U.S. Cl. .................. 715/733; 715/751; 715/753; 715/779
(58) Field of Classification Search .............. 715/778, 715/779, 733, 753
See application file for complete search history.

(56) References Cited

U.S. PATENT DOCUMENTS 6,442,590 B1 * 8/2002 Inala et al. .................. 709/204
7,133,895 B1 * 11/2006 Lee et al. .................... 709/204

* cited by examiner

*Primary Examiner*—Weilun Lo
*Assistant Examiner*—Kim-Lynn Dam
(74) *Attorney, Agent, or Firm*—Whitham, Curtis, Christofferson & Cook, P.C.; Stephen C. Kaufman

(57) ABSTRACT

A Web browser is augmented with collaborative features to support community aware browsing sessions. The augmentation provided includes a data mining plug-in for the browser to establish collaborative context based on Uniform Resource Locator (URL) meta data keywords, or mined topics, and a collaboration co-browser (explorer bar) which displays a collaboration space, called CollabSpace, corresponding to the document that is displayed in the main browser. With this augmented browser, a user can perform various collaboration functions from the collaboration explorer bar, including viewing the online status of members of the CollabSpace, communicate with members of the CollabSpace via electronic mail (e-mail), instant messaging or discussion threads, and register as a member of the CollabSpace. CollabSpaces can be established and associated with one or more Web documents, meta data keywords or topics.

23 Claims, 8 Drawing Sheets

METHOD AND SYSTEM FOR COLLABORATIVE WEB BROWSING

CROSS REFERENCE TO RELATED APPLICATION

This invention is related to the invention disclosed in copending patent application Ser. No. 10/662,617 filed Sep. 15, 2003, by Nitin Nayak, Fenno F. Heath III, Jenny S. Li, Hui Lei, Mitchell A. Cohen, Rakesh Mohan, Josef Schiefer, Stephen V. Stibler, Chung Sheng Li, and Maroun Touma for "A Method and System for Providing a Common Collaboration Framework Accessible from Within Multiple Applications", and assigned to a common assignee herewith. The disclosure of application Ser. No. 10/662,617 is incorporated herein by reference.

BACKGROUND OF THE INVENTION

1. Field of the Invention

The present invention generally relates to collaborative data processing systems and, more particularly, to a method and system for collaborative Web browsing which allows the collective knowledge and experience of an appropriate community to be leveraged during browser sessions.

2. Background Description

Web browsing is usually a solitary activity. Routinely, people browse various sites to research topics, technologies, markets, competition and to obtain reference information in their daily work and lives. Given the vast quantity of distributed information hosted on the Web, people are often confused or lost. There is a need to provide support and help to individuals' browsing activity.

Some Web sites centrally serve as a navigation assistant. These Web sites accompany a user from pate to page, recommending documents or hyperlinks that may be important to the user. This is done on a per Web site basis, and is not part of every Web site an individual may visit. Recommendations can be made based on a combination of factors, including the user's browsing experience, other users' browsing patterns, other users' explicit recommendations, and analysis of document content. Although such systems are useful for helping users find related documents, they do not facilitate direct people-to-people collaboration.

Web browsing should be more community aware or team based. Many have had the experience of browsing a Web page that they could not quite understand but thought it might somehow be relevant to their search or the company's business. Community or team based Web browsing has the potential of benefitting both the individual user and the corporate user during browsing sessions. As users browse various pages with various content, analysis of the browsed page can help identify related pages, or other individuals, in the public or corporate community who have knowledge about the page or page content. As members of the community adapt to community aware browsing, knowledge bases and topical support groups can be established pro-actively. Confidential corporate communities or teams can be formed in order to leverage each other's knowledge and experience during browser sessions.

SUMMARY OF THE INVENTION

It is therefore an object of the present invention to provide a method and system to augment the browser experience for all types of users to make browsing a more team based experience instead of an isolated, individual experience.

According to the invention, a Web browser is augmented with collaborative features to support community aware browsing sessions. The augmentation provided includes:
a data mining plug-in for the browser to establish collaborative context based on Uniform Resource Locator (URL) meta data keywords, or mined topics; and
a collaboration co-browser (referred to as an explorer bar hereinafter) which displays a collaboration space, called CollabSpace, corresponding to the document that is displayed in the main browser.

With this augmented browser, a user can perform various collaboration functions from the collaboration explorer bar, including viewing the online status of members of the CollabSpace, communicate with members of the CollabSpace via electronic mail (e-mail), instant messaging or discussion threads, and register as a member of the CollabSpace. CollabSpaces can be established and associated with one or more Web documents, meta data keywords or topics.

This invention allows the collective knowledge and experience of an appropriate community to be leveraged during browser sessions. It also allows collaboration to take place as an integral part of the browsing behavior, as opposed to a separate, decoupled activity. The invention serves to establish a collaboration/knowledge farm for team or community based browsing and collaborative contexts.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The contextual explorer bar, called the Collab-bar, according to the invention increases the ability of finding the right people, discussion threads, and other tools, at the right times. When installed and configured, the Collab-bar runs within a browser, such as Internet Explorer, as a tool bar and an explorer bar combination, to bring collaborations (people, discussion groups, and tools) specific to the "current browsing context". The tool bar provides functionality for log-in and retrieval and management of contextual collaborations, while the explorer bar provides details of a specific collaboration. The Collab-bar has ability for some end-user configuration and customization, which is saved in the operating system (OS) registry, such as Windows registry.

Figure 1:
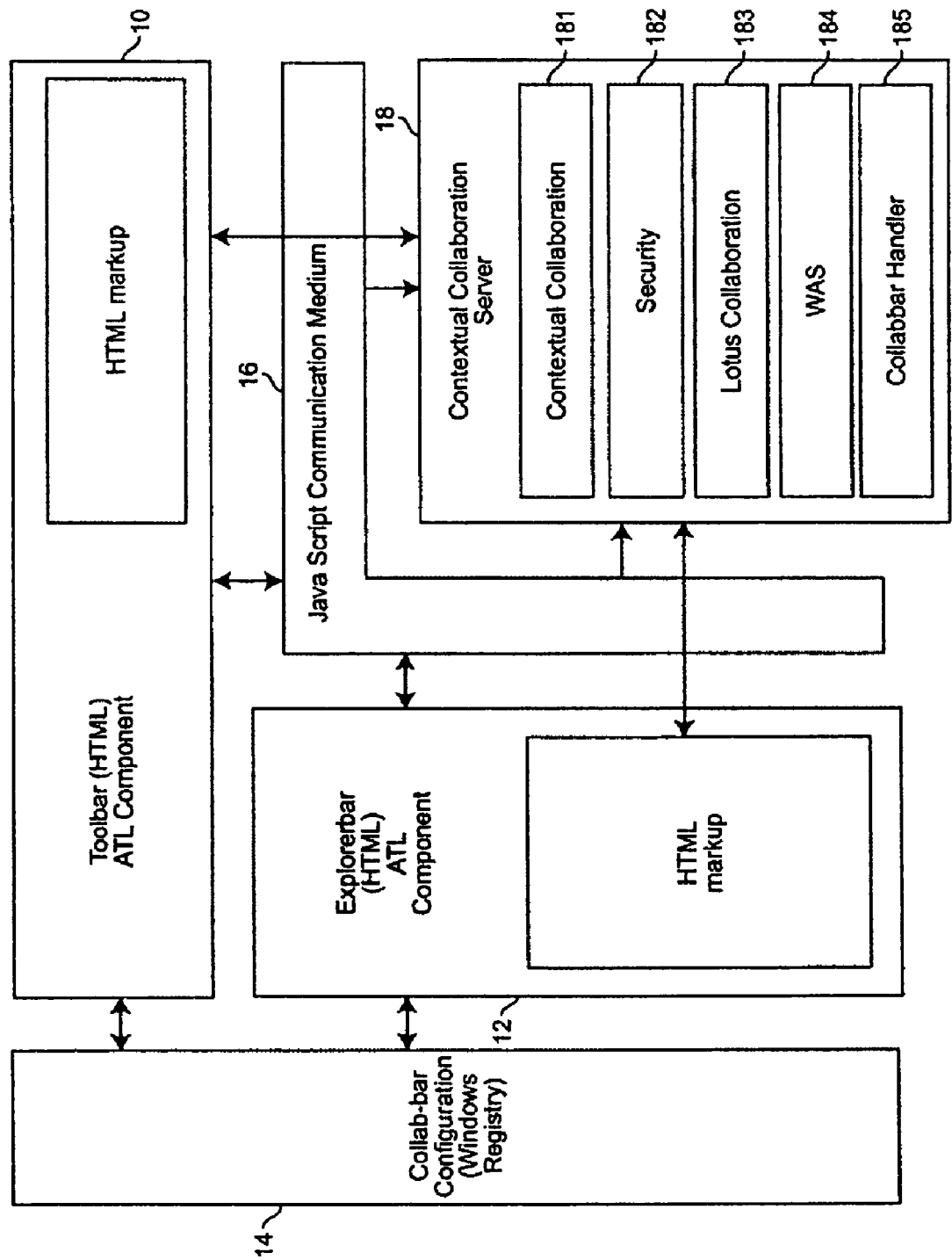
FIG. 1 is a block diagram showing the architecture of the contextual collaboration explorer bar, called the Collab-bar, according to the invention, and depicts a toolbar, explorer bar and a contextual collaboration server.
Figure 2:
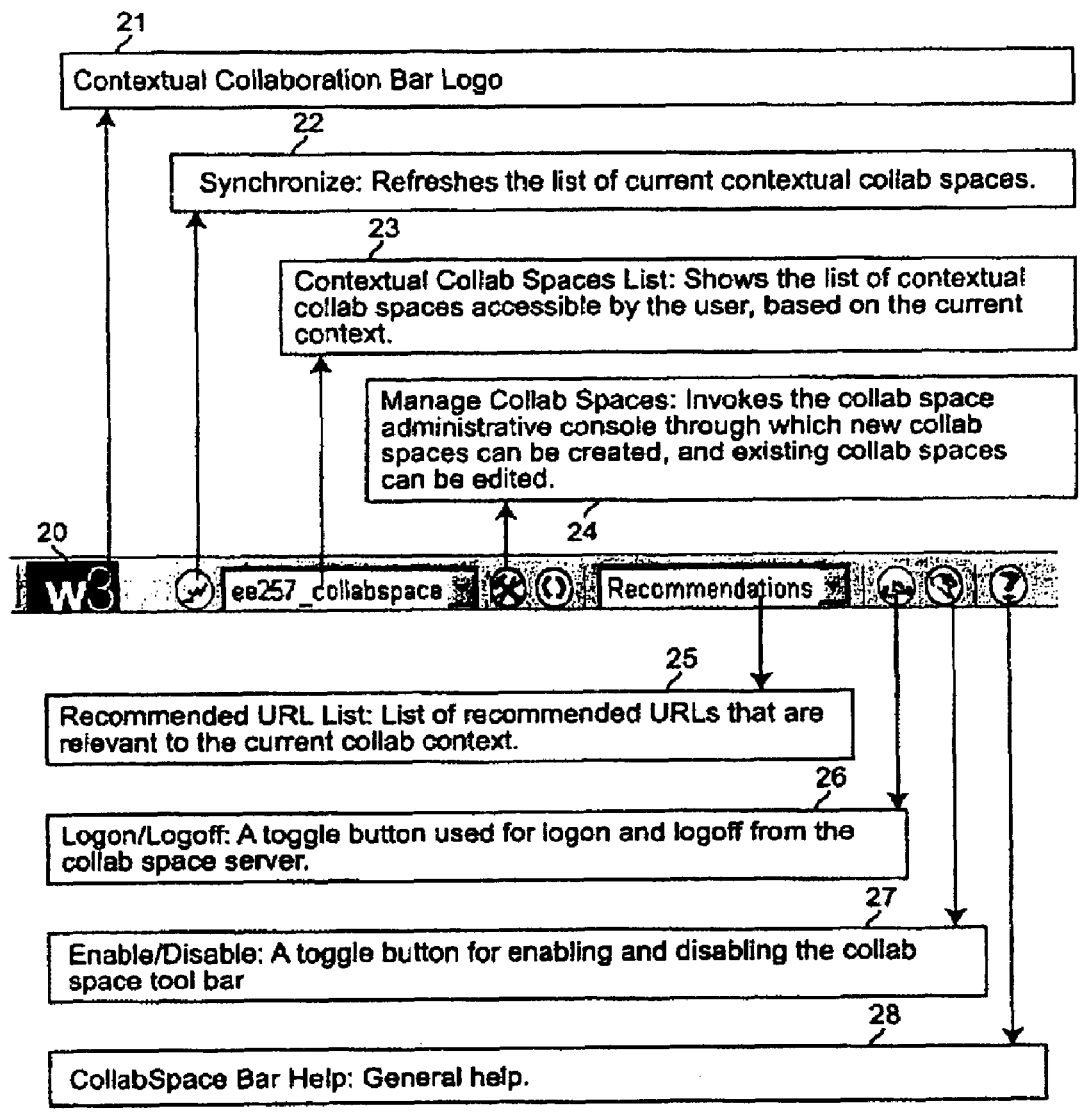
FIG. 2 is a diagram showing the collaboration toolbar of the preferred embodiment of the invention.

Referring now to the drawings, and more particularly to FIG. 1, there is shown the architecture of the Collab-bar according to the invention. There are five components in the Collab-bar: the Collab-bar Toolbar 10; the Collab-bar Explorer bar 12; a Javascript communication medium 14; the Collab-bar configuration 16; and the Collab-bar Handler, which is part of the contextual collaboration server 18. The Collab-bar Toolbar 10 is a COM (Component Object Model) band object which is contained by the Rebar Control that holds Internet Explorer's toolbars. It is implemented in HTML (HyperText Markup Language) using Microsoft Active Template Library (ATL). The Collab-bar explorer bar 12 is contained by Internet Explorer and implemented in HTML using ATL. Both the Collab-bar Toolbar 10 and the Collab-bar Explorer bar 12 are registered in the Windows registry. Communication between the Collab-bar 10 and the Collab-bar Explorer bar 12 and the contextual collaboration server 18 is facilitated by the Java Script communication medium 16. The contextual collaboration server 18 includes several modules which, in the preferred embodiment, include a contextual collaboration module 181, a security module 182, a Lotus collaboration module 183, a WAS (Websphere Application Server) module 184, and a Collab-bar handler 185. The contextual collaboration module 181 is a context manager that manages relationships of collaboration elements, like people, topics, team rooms, discussions, documents, etc. The security module is a basic security element that identifies users and can classify those users as various role players in the system. The Lotus collaboration module 183 is used to integrate with collaboration modalities like team rooms, instant messaging, application sharing, etc. The IBM Websphere Application Server is a high-performance and scalable transaction engine for dynamic e-business applications. The WAS module 184 is the middleware component of the Websphere Application Server. The Collab-bar handler 185 generates the contents of the toolbar in a JSP (Java Server Page) at the WAS server. The Collab-bar contains two user interface (UI) components that run as Internet Explorer Band Objects; the Toolbar and the Explorer bar, both of which are ATL components. The first one, the Collaboration Toolbar, is shown in FIG. 2, which hosts command buttons to retrieve, manage contextual Collaboration Spaces and command buttons for authentication and configuration. In the illustration of the implementation of the Collaboration Toolbar shown in FIG. 2, there is first of all a contextual collaboration bar logo 21, here shown as w3, for "World Wide Web", although any logo could be adopted. Next, there is a synchronize button 22 which us used to refresh the list of current contextual Collaboration Spaces, here referred to as CollabSpaces. A pull down menu 23 provides a list of CollabSpaces. When the down arrow button is pressed, the menu shows a list of contextual collaboration spaces accessible by the user, based on the current context. The Manage CollabSpaces button 24 invokes the collaboration space administrative console through which new collaboration spaces can be created and existing collaboration spaces can be edited. Collaboration spaces can also be associated with one or more Web documents, topics and meta data. A second pull down menu 25 provides a recommended URL list. When the down button is pressed, a list of recommended URLs that are relevant to the current collaboration context is displayed. The Logon/Logoff button 26 is a toggle button used for logging onto and logging off from a collaboration space server. The Enable/Disable button 27 is a toggle button for enabling and disabling the collaboration space toolbar. Finally, the CollabSpace Bar Help button 28 is used to access general help.

The toolbar can be invoked from the Internet Explorer "View/Toolbars" menu. Invoking the toolbar does not log in the user to the contextual collaboration server. The user is explicitly expected to log-in to the collaboration server. Once logged in, the user will appear as a passive collaboration member for other members of a contextual collaboration space. The user is expected to enable the toolbar for retrieving the computed context sensitive collaborations based on the browsing experience. Disabling the collaboration toolbar will not interact with the contextual collaboration server for active content mining.

As mentioned, the toolbar band object is essentially a COM (Component Object Model) object that exists within a Rebar Control container that holds Internet Explorer's toolbars. Being a tool band COM object, this object is registered as an OLE (Object Linking and Embedding) in-process server with CATID_InfoBand (category identification) component category. This control hosts the Internet Explorer Web Browser control, thus giving access to script parsing, rendering and browsing facilities of Internet Explorer. This makes the communication with the contextual collaboration server easier. By default, the user interface (UI) of the control is provided by the Web Browser Control. This covers the entire area of the control. The UI is rendered based on the HTML markup generated by the collaboration bar handler component of the contextual collaboration server through servlet and JSP (Java Server Page) technology.

The collaboration server component 81 maintains collaborative content and allows for the collaborative Web browser to interact with the collaboration The toolbar listens for OLE events (that might potentially change the current collaboration context, like document load complete event) generated by the Internet Explorer main browser control. When the tool bar receives such events, those events are communicated back to the collaboration server so a new set of contextual collaborations can be rendered in the toolbar.

Figure 3:
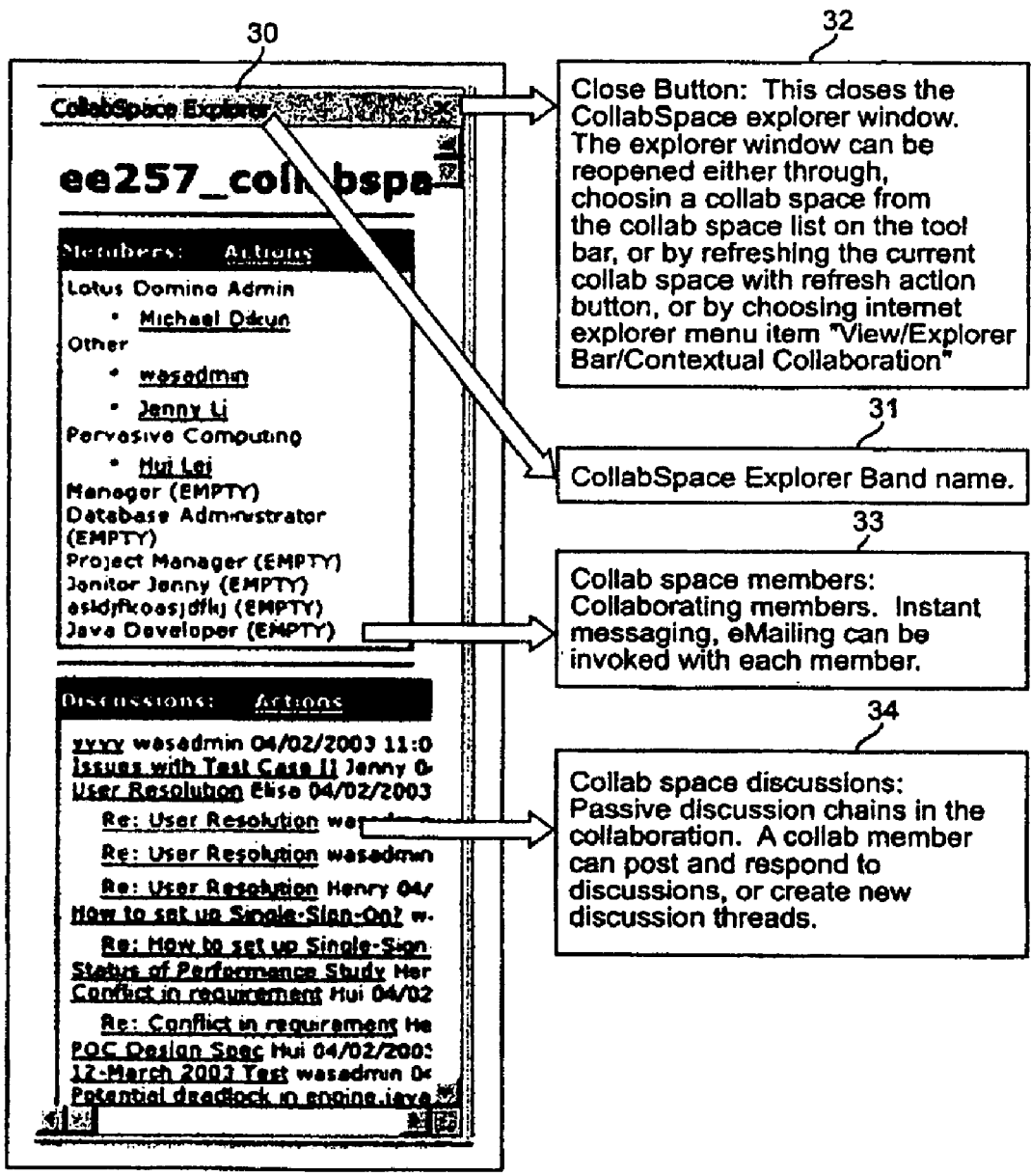
FIG. 3 is a diagram showing the explorer bar or co-browser of the preferred embodiment of the invention.

The second user interface (UI) component in the Collab-bar is the Collaboration Explorer, shown in FIG. 3, which presents the collaboration details, such as people, discussion threads, and tools. The explorer bar can be invoked from the Internet Explorer "View/Explorer bar" menu. The same explorer bar can also be invoked from the toolbar when a specific collaboration is selected or an existing collaboration is refreshed. The top bar 31 in the Collaboration Explorer contains the brand name, here CollabSpace Explorer. On the right hand edge of the top bar 31 is a close button 32 "x" which, when pressed, closes the CollabSpace explorer window. The explorer window can be re-opened either through choosing a CollabSpace from the CollabSpace list on the toolbar or by refreshing the current CollabSpace with the refresh action button or by choosing the Internet Explorer menu item "View/Explorer Bar/Contextual Collaboration". The CollabSpace Explorer window has two panes; a members pane 33 and a discussions pane 34. The members pane 33 lists the current collaborating members. Instant messaging and e-mail can be invoked for each of the current collaborating members. The discussions pane 34 lists passive discussion chains in the collaboration. A collaboration member can post and respond to discussions or create new discussion threads (CollabSpaces).

Figure 4:
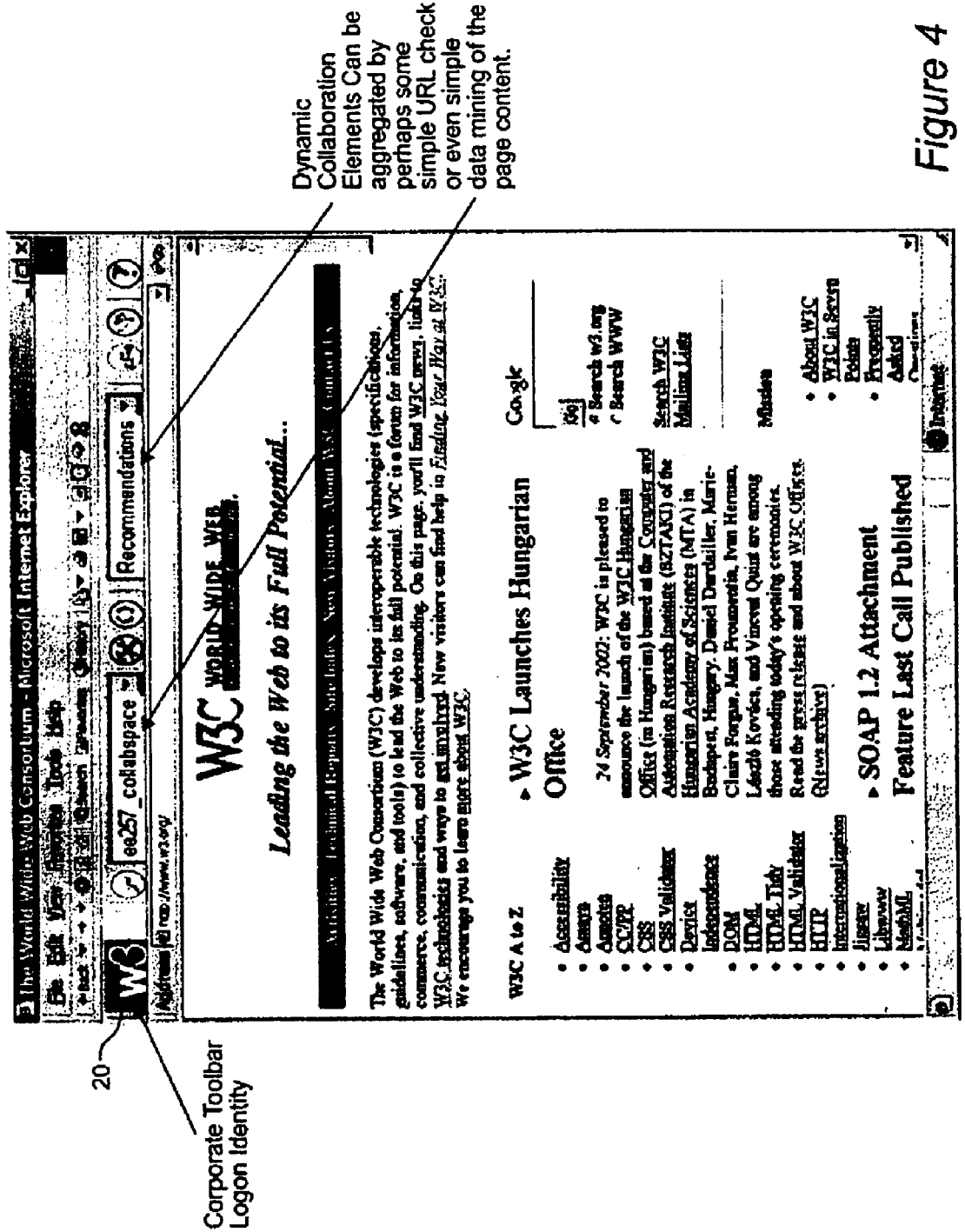
FIG. 4 is a screen print of a Web page for illustrating the application of the invention to a collaborative Web search.
Figure 5:
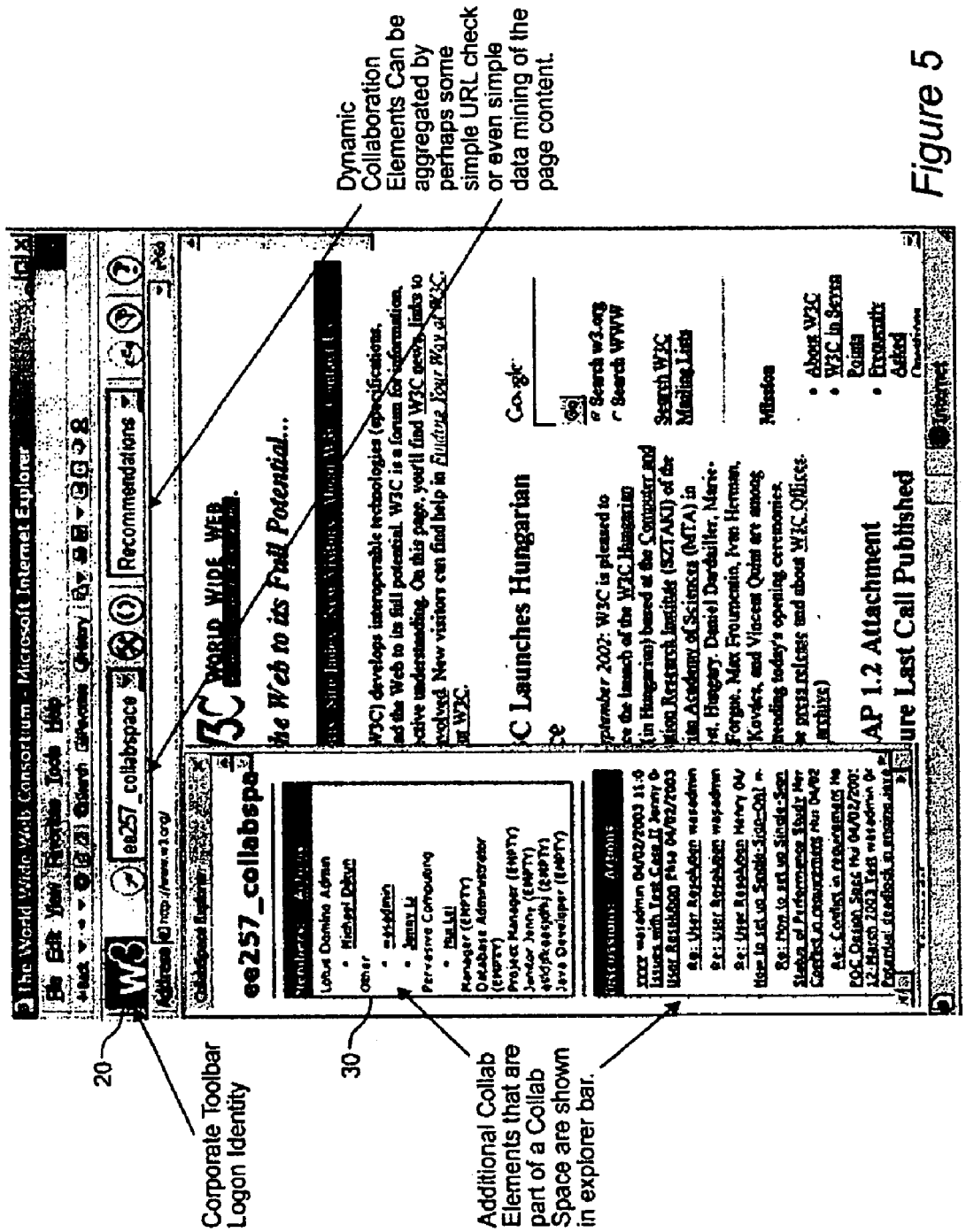
FIG. 5 is a screen print of the Web page of FIG. 4 with the Collab-bar of FIG. 3 superimposed.

FIG. 4 is a screen print of a Web page showing the Collaboration Toolbar 20 located just below the Internet Explorer Toolbar 40. FIG. 5 shows the Collab-bar Explorer bar component 30 overlying part of the Web page. The Collaboration Toolbar 20 provides dynamic collaboration elements that can be aggregated by perhaps some simple URL check or even simple data mining of the page content. The Collab-bar Explorer bar 30 adds collaboration elements that are part of the CollabSpace.

Figure 6:
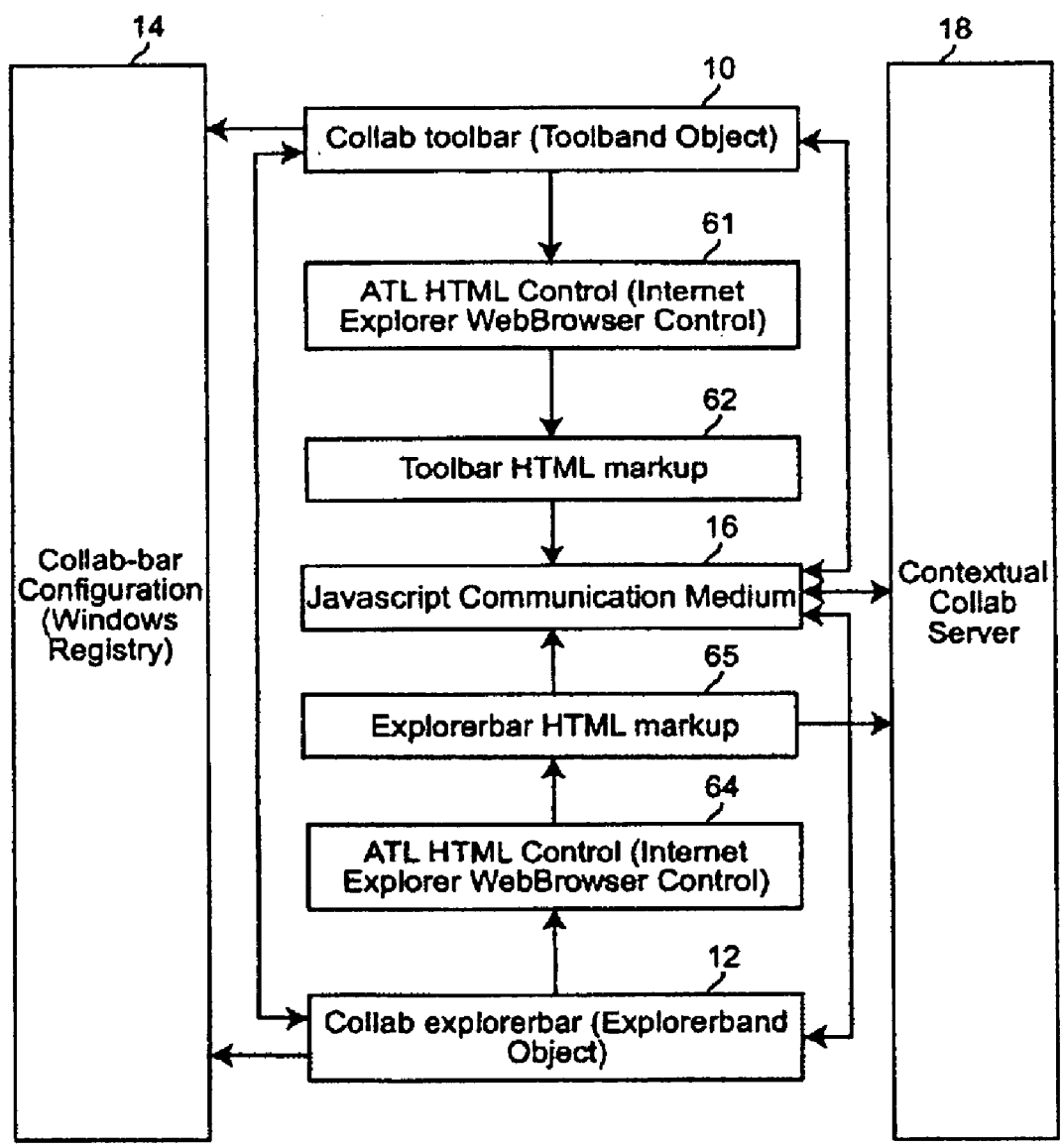
FIG. 6 is a data flow diagram showing the process of the Collab-bar configuration.

Being COM (Component Object Module) objects, the toolbar and explorer bar do not communicate directly with the Web Collab-bar application. The communication between the band objects and the contextual collaboration server 18 is handled through a Java Script communication medium 16, as shown in FIG. 6. FIG. 6 is similar to FIG. 1 but shows the data flow between the several components. In FIGS. 6 and 1, like reference numerals represent the same objects.

The toolbar band object 10 reads the user configuration settings from the Collab-bar configuration (in the Windows registry) 14 and initializes user session which can be accessed by the contextual collaboration server 18. The COM object communicates with the contextual collaboration server 18 through ATL HTML component 61, through the HTML markup 62 and Java Script communication medium 16.

When an event occurs in the browser (like a new document is loaded), the toolbar 10 picks up the event through the OLE (Object Linking and Embedding) event handling mechanism and communicates the event to the collaboration server 18 so a new set of context dependent collaborations can be retrieved. Again, this communication is handled through the same path; i.e., toolbar COM object to ATL HTML component 61 to HTML markup 62 to Java Script communication medium 16 to collaboration server 18.

Similarly, communications between the Collab Explorer bar 12 and the contextual collaboration server 18 are handled through the ATL HTML component 64 to the HTML markup 65 to Java Scrip communication medium 16 to collaboration server 18.

User parameters for the tool bar and explorer bar are customized through the windows registry. During the initialization of the Collab-bar, these parameters are read and saved in the user session. These configuration settings are customizable by the user. The settings control:

where the collaboration server is located;
automatically enable at log-on; and
activate recommendations based on content mining.

The collaboration tool bar provides command buttons to modify these configuration settings.

Figure 7:
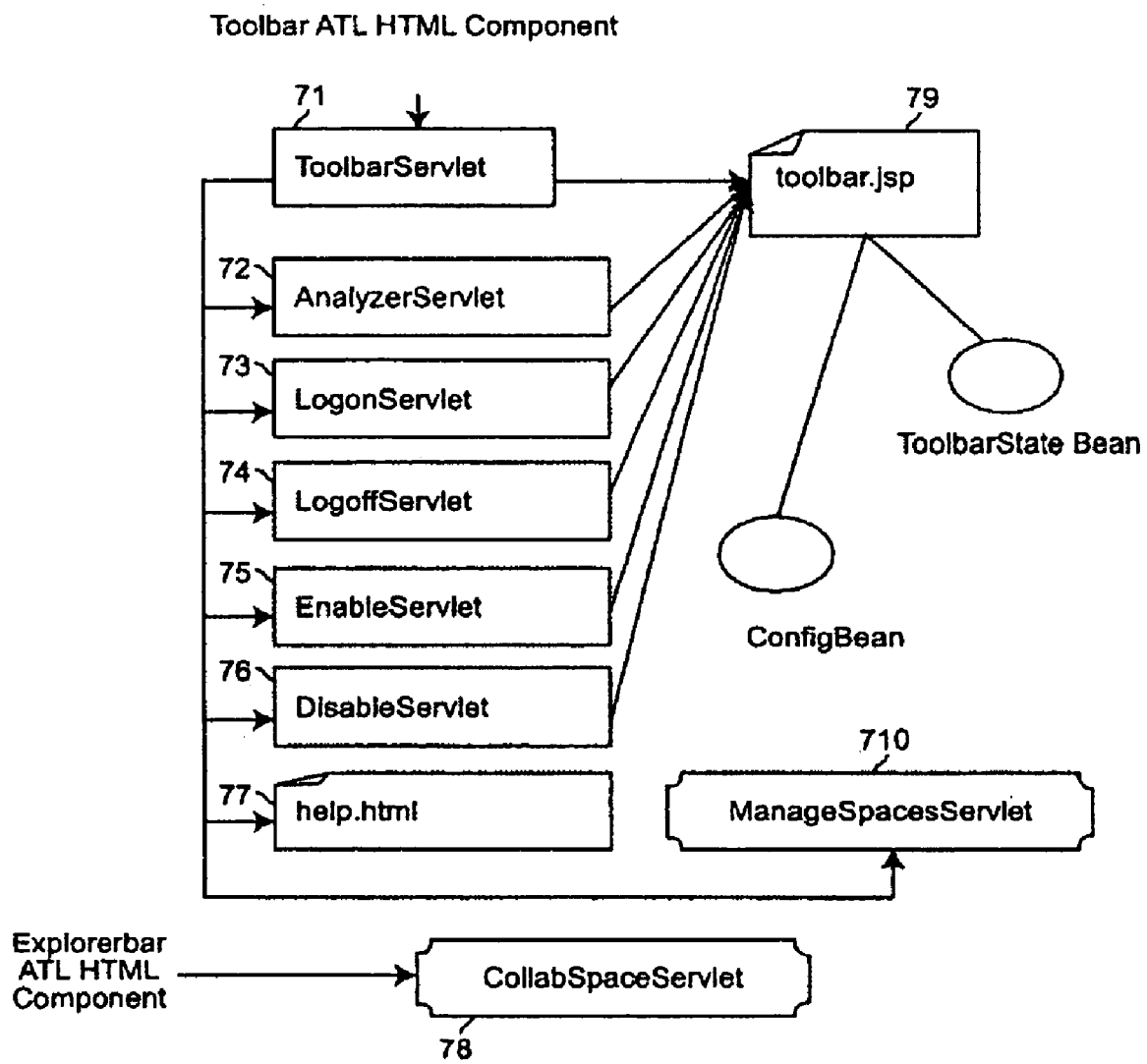
FIG. 7 is a data flow diagram showing the Collab-bar Web application running on the contextual collaboration server that renders the Collab-bar user interface (UI)

The Collab-bar (toolbar and explorer bar look and feel) is rendered through the Collab-bar Web application running on the contextual collaboration server 18. Both the band objects rely on ATL HTML component for rending the user interface (UI). These components point to the Collab-bar view handler for look and feel. As shown in FIG. 7, the ToolbarServlet 71 handles the events on the toolbar and is also responsible for bringing the right set of command buttons, based on the state of the toolbar. ExplorerbarServlet is responsible for rendering the collaboration details in the explorer bar.

The Toolbar Servlet 71 is used to process user interaction with the toolbar. For each user interaction described in FIG. 2, one of a set of supporting servlets in FIG. 7 will be called to process the user interaction. After any of the servlets in FIG. 7, except for the CollabSpaceServlet 78, the Toolbar.jsp 79 will be called to create a new rendering of the toolbar 20 as can be seen in FIG. 2 in response to the user's interaction with the toolbar. The Analyzer Servlet 72 is used to data mine the URL, Meta Data, or key topics from the user's most recently loaded Web page in FIG. 4. The mining is used to determine what related links, Collabspaces, buddies, etc., should be brought into view of the user. The Logon Servlet 73 is invoked when a user selects the Logon/Logoff toggle 26 in FIG. 2, and is used to logon the user to the Contextual Collaboration Server 18. The Logoff Servlet 74 is invoked when a user selects Logon/Logoff toggle 26 in FIG. 2 as well, and is used to end the user's session with the Contextual Collaboration Server 18. The EnableServlet 75 is invoked when a user selects the Enable/Disable toggle 27 in FIG. 2, and is used to enable the Analysis, Explorer Bar, and Toolbar generation of collaboration elements. The DisableServlet 76 is invoked when a user selects the Enable/Disable toggle 27 in FIG. 2, and is used to disable all the Analysis and generation of Toolbar and Explorer bar elements. The Help.html 77 is displayed when the user selects the CollabSpace Bar Help button 28 in FIG. 2, and is merely used to display a help page for how to use the Toolbar. The ManageSpacesServlet 710 is invoked when a user selects the Manage Collab Spaces button 24 in FIG. 2, and is used to display an administration console for the user to create, delete, edit, various Collabspaces. The CollabSpaceServlet 78 is invoked when a user selects the Contextual Collab Spaces button 23 via the explorer bar, and is used to interact with the Contextual Collaboration Server 18. The CollabSpaceServlet 78 is responsible for rendering the collaboration details in the explorer bar.

Single sign-on between toolbar, explorer bar with view on discussion threads (CollabSpace), and sametime is achieved through the International Business Machines (IBM) WebSphere Application Server based security. The IBM WebSphere Application Server is a high-performance and extremely scalable transaction engine for dynamic electronic business (e-business) applications. When the user selects the log in command button 26 on the toolbar, it sends a request to the LongonServlet 73 which is protected in the Collaboration server 18. As a result, the user receives a password challenge response. Upon submitting the right credentials, the application server creates an LTPA Token and pushes down the credentials to the client through a browser cookie. Since all the browser components (main browser control, toolbar ATL HTML component, and explorer bar ATL HTML component) share the same process space, they share the cookies too. So when collaboration is invoked in the explorer bar, the explorer bar requests the server for collaboration details passing through the cookie. This cookie is cleared when a specified timeout occurs, or the user explicitly logs out from the toolbar.

Figure 8:
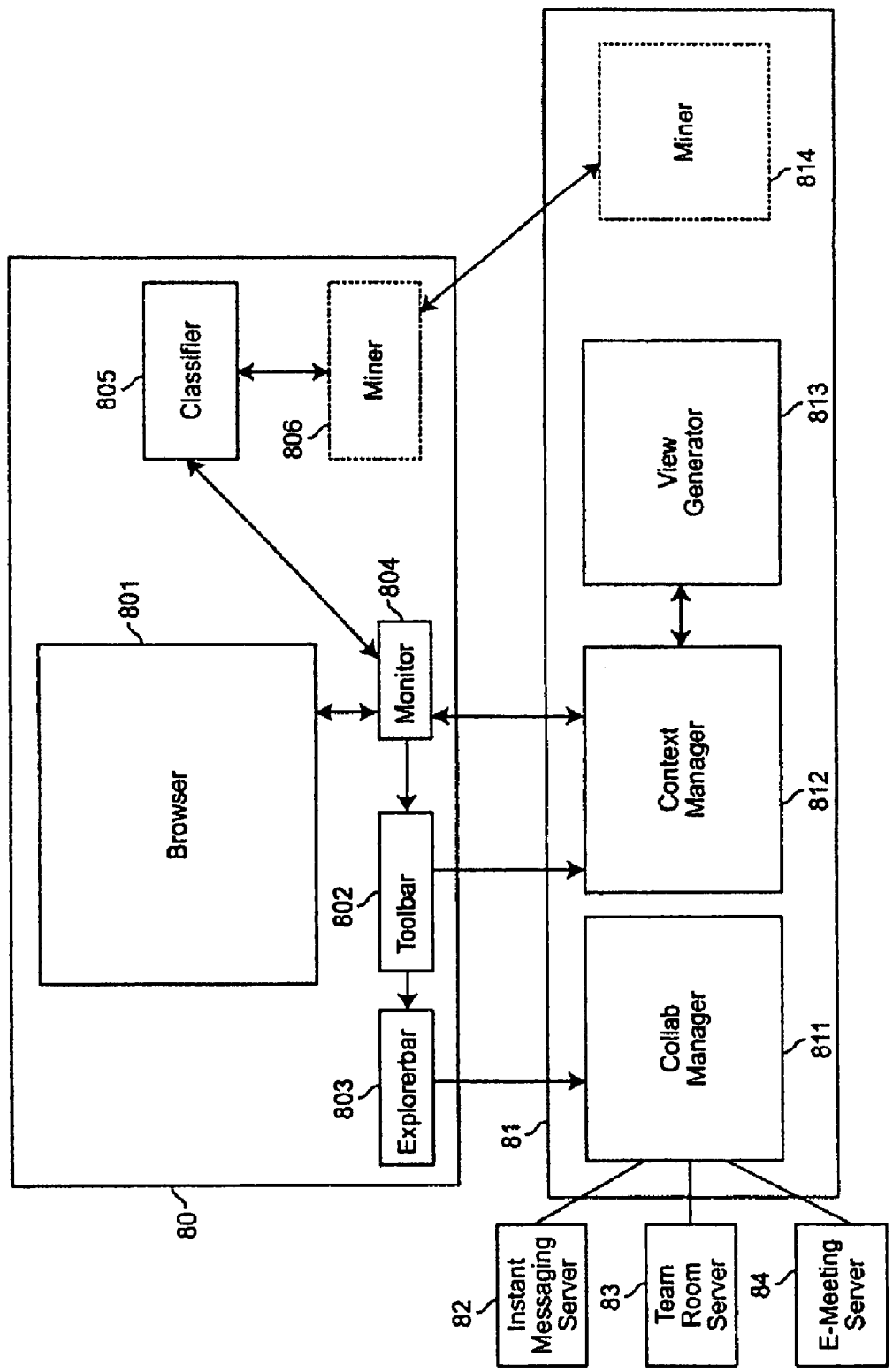
FIG. 8 is a block diagram showing the architecture of the overall system which supports the collaborative Web browsing according to the invention.

FIG. 8 is a block diagram showing the architecture of the overall system, and this embodiment realizes the "miner" part, 806 and 814, of the architecture as the AnalyzerServlet 72 in FIG. 7. In FIG. 8, the augmented browser 80, comprising an Internet Explorer browser 801, a toolbar 802, an explorer bar 803, a monitor 804, and a classifier 805 is provided with a miner plug-in 806. The browser 801 populates with Web sites and notifies the monitor 804 when new documents arrive. The monitor 804, in turn, attempts to classify the newly loaded content using the classifier 805. The classifier 805 uses the content, URL or meta data associated with the loaded page and passes this information to the miner 806 in order to identify content. The monitor 804 then attempts to discover related CollabSpaces, URL links, and role players that might be helpful to the loaded content in the browser 801. Once the monitor 804 has completed classifying the content and collecting the related collaboration context, the monitor instructs the toolbar 802 and the explorer bar 803 to populate with the corresponding collaborative elements that are related to the current browsing context.

The collaboration server component 81 maintains collaborative content and allows for the collaborative Web browser to interact with the collaboration content. The collaboration server 81 can also have a miner 814 content. The collaboration server 81 can also have a miner 814 for more advanced mining. The view generator 813 is used to assemble together collaboration elements that are part of a collaboration context. The context manager 812 maintains relationships between collaboration elements and provides a mechanism to inference relationships between collaboration elements. The collaboration manager 811 also provides a mechanism to interact with various collaboration modalities, like instant messaging 82, team rooms 83, and e-meetings 84. The collaboration manager 811 additionally maintains a life cycle of collaboration spaces.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for collaborative Web browsing, comprising the steps of:
    defining collaboration spaces which comprise collaboration members and discussion chains;
    associating collaboration spaces with one or more Web documents, topics and meta data;
    defining a collaboration toolbar and displaying the collaboration toolbar on a user interface (UI), the collaboration toolbar including a user UI components to logon/logoff, manage collaboration spaces, list related collaboration spaces, and list related links;
    defining a collaboration co-browser which is displayed on the UI;
    monitoring a user's browsing activity; and
    mining browsed content, URL (Universal Resource Locator) and meta data to determine related collaboration spaces.

2. The method of claim 1, further comprising the step of populating the collaboration toolbar with appropriately related collaboration elements.

3. The method of claim 1, wherein upon user selection of an appropriately related collaboration space from the toolbar, further comprising the step of rendering by the collaboration co-browser a collaboration space related to the content, URL and meta data of a loaded Web page.

4. The method of claim 1, further comprising the step of allowing a user to instantiate collaboration operations from the collaboration co-browser.

5. The method of claim 1, further comprising the step of augmenting by the collaboration co-browser a Web browser and displaying collaboration elements of an appropriate collaboration space corresponding to the user's monitored browsing activity.

6. A system for collaborative Web browsing, comprising:
    means for associating collaboration spaces with one or more Web documents, topics and meta data;
    means for defining collaboration spaces which comprise collaboration members and discussion chains;
    a display device for displaying a graphical user interface;
    a collaboration toolbar component which generates a collaboration toolbar display on the graphical user interface, the collaboration toolbar including a user logon/logoff toggle button, buttons to manage and configure the collaboration spaces, a list box of related collaboration spaces, and a list box of related links;
    a collaboration co-browser component which generates a collaboration co-browser display on the graphical user interface when a user logons on;
    a monitor that observes a user's browsing activity, the collaboration co-browser component responding to the monitor and displaying collaboration elements of an appropriate collaboration space; and
    a mining component to mine the browsed content, URL (Universal Resource Locator), and meta data to determine related collaboration spaces.

7. The system of claim 6, wherein upon mining the browsed content by the mining component, the monitored browsing activity populates the collaboration toolbar component with appropriately related collaboration elements.

8. The system of claim 6, wherein the collaboration co-browser component renders a collaboration space related to browser context.

9. The system of claim 6, wherein collaboration operations are instantiated from the collaboration co-browser.

10. The method of claim 4, wherein collaboration operations include sending email, instant messaging, creating new discussion threads, and posting and responding to discussions.

11. The system of claim 6, further comprising means for populating the collaboration toolbar with appropriately related collaboration elements.

12. The system of claim 6, wherein the collaboration co-browser is responsive to a selection of an appropriately related collaboration space from the toolbar for rendering a collaboration space related to the content, URL and meta data of a loaded Web page.

13. The system of claim 6, wherein the collaboration co-browser renders a collaboration space related to the content, URL and meta data of a loaded Web page.

14. A system for collaborative Web browsing, comprising;
    an augmented browser comprising an Internet browser, a collaboration toolbar, a collaboration explorer bar, a monitor, and a classifier provided with a miner plug-in, the Internet browser populates with Web sites and notifies the monitor when new documents arrive, the monitor, in turn, attempts to classify the newly loaded content using the classifier, the classifier uses the content, URL (Universal Resource Locator) or meta data associated with the loaded page and passes this information to the miner plug-in in order to identify content to determine page, topic or meta data content, the monitor then attempts to discover related collaboration spaces (ColabSpaces), URL links, and role players that might be helpful to the loaded content in the Internet browser, once the monitor has completed classifying the content and collecting the related collaboration context, the monitor instructs the toolbar and the explorer bar to populate with corresponding collaborative elements that are related to a current browsing context; and
    a collaboration server component that maintains collaborative content and allows for the collaborative Web browser to interact with the collaboration content, the collaboration server component including a view generator used to assemble together collaboration elements that are part of a collaboration context and a context manager communicating with the collaboration toolbar, monitor and view generator and which maintains relationships between collaboration elements and provides a mechanism to inference relationships between collaboration elements and elements infer relationships between collaboration elements.

15. The system of claim 14, wherein the collaboration server component further includes a miner communicating with the miner plug-in of the augmented browser for more advanced mining.

16. The system of claim 14, wherein the collaboration server component further includes a collaboration manager communicating with the collaboration explorer bar of the augmented browser and which provides a mechanism to interact with various collaboration modalities, including instant messaging, team rooms, and e-meetings.

17. The system of claim 14, wherein the collaboration toolbar of the augmented browser hosts command buttons to retrieve, manage contextual collaboration spaces and command buttons for authentication and configuration.

18. The system of claim 17, wherein the command buttons include a pull down menu button which, when selected, provides a list of collaboration spaces accessible by the user based on a current context, a manage collaboration spaces button which invokes a collaboration space administrative console through which new collaboration spaces can be created and existing collaboration spaces edited, and a recommended URL list pull down menu button which, when selected, provides a list of recommended URLs that are relevant to a current collaboration context.

19. The system of claim 18, wherein the command buttons include a logon/logoff toggle button used for logging onto and logging off from a collaboration space server.

20. The system of claim 14, wherein the collaboration explorer bar of the augmented browser is displayed as a window that includes a members pane, which lists current collaborating members, and a discussions pane, which lists discussion chains in a collaboration permitting a collaboration member to post and respond to discussions or create new discussion threads.

21. The system of claim 14, wherein the collaboration tool bar and the collaboration explorer bar are registered in an operating system (OS) registry.

22. The system of claim 21, wherein communication between the collaboration toolbar, the collaboration explorer bar and the context manager are facilitated by a Java Script communication medium.

23. The system of claim 14, wherein the collaboration server component includes a security module that identifies users and classifies those users as various role players in the system.

* * * * *